(12) United States Patent
Ushijima et al.

(10) Patent No.: US 8,358,849 B2
(45) Date of Patent: Jan. 22, 2013

(54) IMAGE PROCESSING APPARATUS AND IMAGE PROCESSING METHOD

(75) Inventors: Satoru Ushijima, Kawasaki (JP); Masayoshi Shimizu, Kawasaki (JP); Kimitaka Murashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 13/064,298

(22) Filed: Mar. 16, 2011

(65) Prior Publication Data
US 2011/0170785 A1 Jul. 14, 2011

Related U.S. Application Data

(63) Continuation of application No. PCT/JP2008/066787, filed on Sep. 17, 2008.

(51) Int. Cl.
*G06K 9/46* (2006.01)
*G06K 9/66* (2006.01)
(52) U.S. Cl. ..................................................... 382/195
(58) Field of Classification Search ..................... None
See application file for complete search history.

(56) References Cited

U.S. PATENT DOCUMENTS

| 6,711,587 | B1 * | 3/2004 | Dufaux | 1/1 |
| 8,005,271 | B2 * | 8/2011 | Kawada | 382/118 |
| 8,233,769 | B2 * | 7/2012 | Okamoto et al. | 386/242 |
| 2011/0274363 | A1 * | 11/2011 | Kawada | 382/224 |

FOREIGN PATENT DOCUMENTS

| JP | 2000-123185 | 4/2000 |
| JP | 2004-171490 | 6/2004 |
| JP | 2006-323779 | 11/2006 |

OTHER PUBLICATIONS

Henry Schneiderman et al., "Object Detection Using the Statistics of Parts", International Journal of Computer Vision, 2002, 58 pages.
International Search Report for PCT/JP2008/066787, mailed Oct. 21, 2008.

* cited by examiner

*Primary Examiner* — Samir Ahmed
(74) *Attorney, Agent, or Firm* — Staas & Halsey LLP

(57) ABSTRACT

An image processing apparatus includes a face detection processing unit that reduces an image of a frame to be processed to a first level among several reduction levels to generate a reduced image of the frame to be processed, with one of frames included in a moving image as the frame to be processed, and compares the reduced image generated by the reducing unit and the learning data to extract a face image from the reduced image. When the extraction of the face image from the frame to be processed is ended, the face detection processing unit updates the frame to be processed to a next frame subsequent to the frame to be processed and generates a reduced image that is reduced to another level other than reduction levels adjoining the first level.

6 Claims, 13 Drawing Sheets

FIG.3

| REDUCTION LEVEL | 0 | 1 | 2 | 3 | 4 | 5 | 6 | 7 | |
|---|---|---|---|---|---|---|---|---|---|
| FIRST DETECTION | ● | ◉ | | | | | | | FACE 2 DETECTED |
| SECOND DETECTION | | | | ◉ | ● | ◉ | | | FACE 3 DETECTED |
| THIRD DETECTION | | ◉ | ● | ◉ | | | | | FACES 1 & 2 DETECTED |
| FOURTH DETECTION | | | | | | ◉ | ● | ◉ | DETECTION OF ALL SIZES COMPLETED |
| FIFTH DETECTION | ◉ | ● | ◉ | | | | | | FACES 1 & 2 DETECTED |
| SIXTH DETECTION | | | | | ◉ | ● | ◉ | | FACE 3 DETECTED |
| SEVENTH DETECTION | | | ◉ | ● | ◉ | | | | FACE 3 DETECTED |
| EIGHTH DETECTION | | | | | | | ◉ | ● | |

⋮

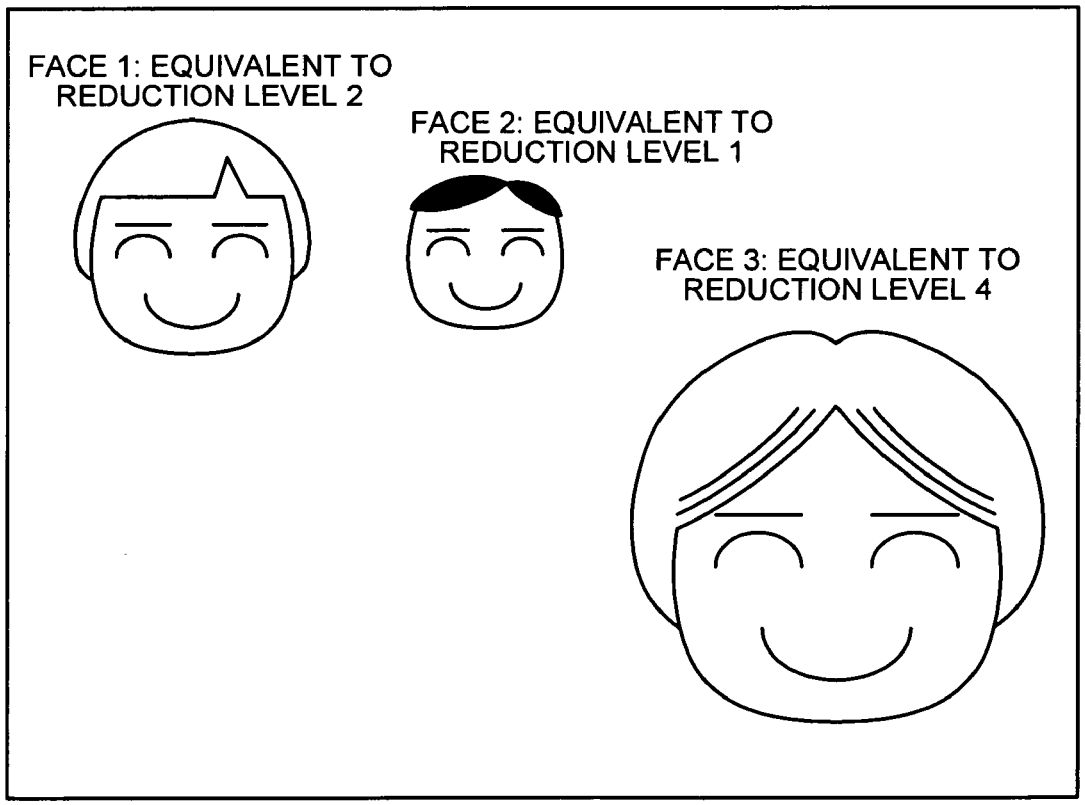

FIG.4

FACE 1: EQUIVALENT TO REDUCTION LEVEL 2

FACE 2: EQUIVALENT TO REDUCTION LEVEL 1

FACE 3: EQUIVALENT TO REDUCTION LEVEL 4

FACE LEARNING DATA
130a

| POSITION INFORMATION | CONVERSION COEFFICIENT VALUE |
|---|---|
| 1, 1 | 1 |
| 1, 2 | 0 |
| 1, 3 | 0 |
| ... | ... |

FIG.7

NON-FACE LEARNING DATA
130b

| POSITION INFORMATION | CONVERSION COEFFICIENT VALUE |
|---|---|
| 1, 1 | 1 |
| 1, 2 | 0 |
| 1, 3 | 0 |
| ... | ... |

FIG.8

COMPARISON TARGET DATA
130c

| POSITION INFORMATION | CONVERSION COEFFICIENT VALUE |
|---|---|
| 1, 1 | 1 |
| 1, 2 | 0 |
| 1, 3 | 0 |
| ... | ... |

FIG.10
COMPARISON RESULT TABLE
| DETECTION RANGE IDENTIFICATION INFORMATION | COMPARISON RESULT |
|---|---|
| 1001 | ○ |
| 1002 | ○ |
| 1003 | ○ |
| ... | ... |
FIG.11
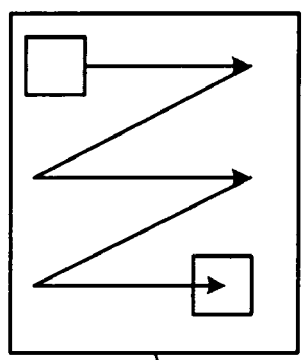
130c
COMPARISON
TARGET DATA
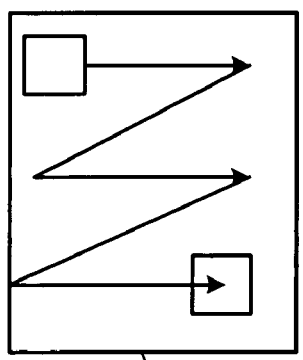
130a
FACE LEARNING
DATA
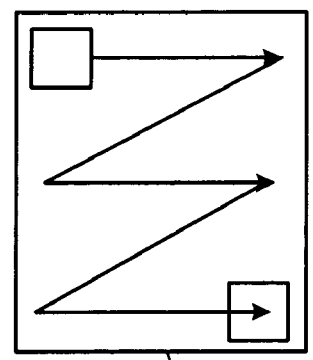
130b
NON-FACE
LEARNING DATA

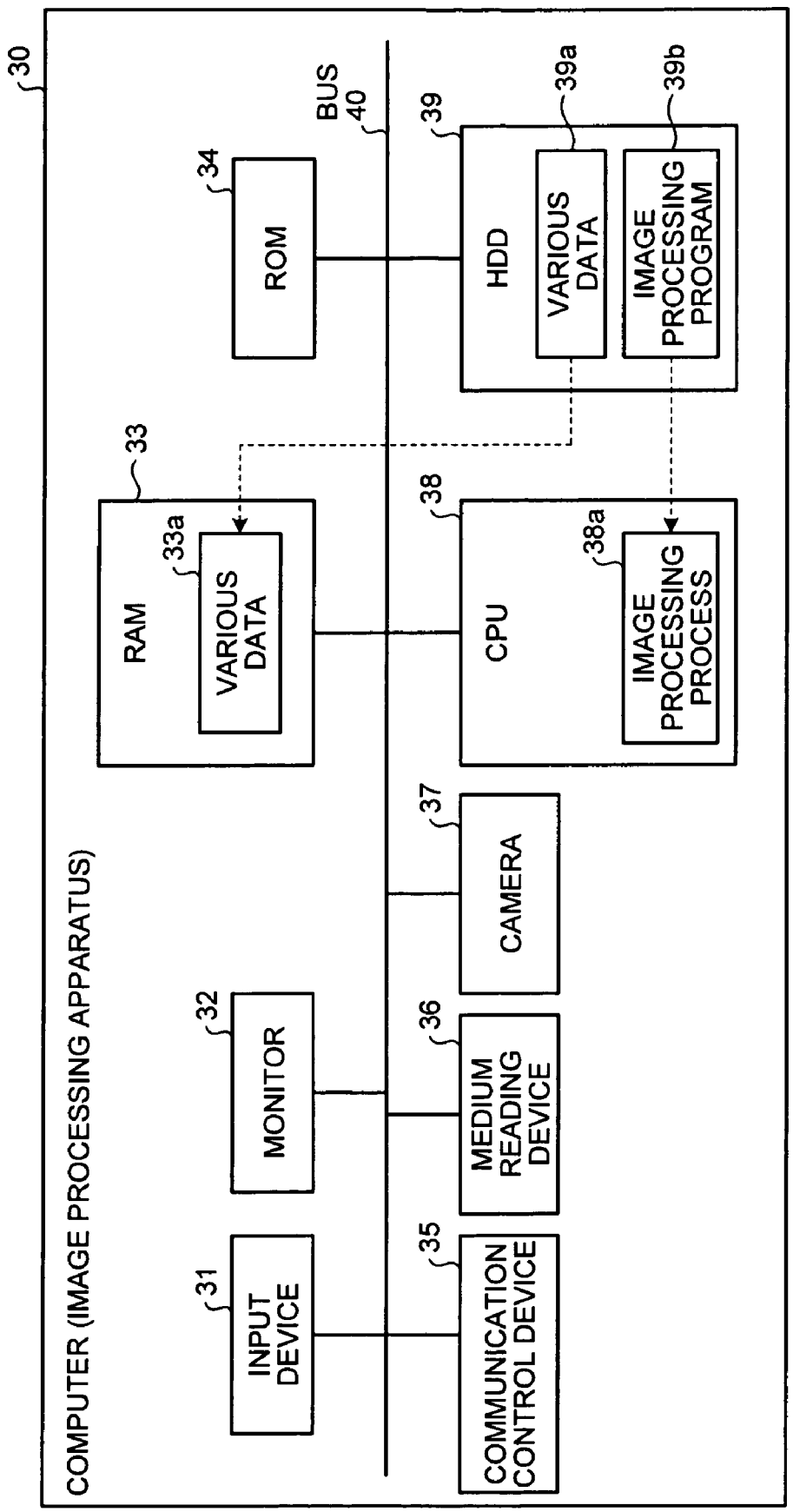

IMAGE PROCESSING APPARATUS AND IMAGE PROCESSING METHOD

CROSS-REFERENCE TO RELATED APPLICATION

This application is a continuation of International Application No. PCT/JP2008/066787, filed on Sep. 17, 2008, the entire contents of which are incorporated herein by reference.

FIELD

The embodiments discussed herein are directed to an image processing apparatus and an image processing method for detecting an object from image data.

BACKGROUND

In recent years, research has been made about object detection to detect various types of objects (such as a person's face and a car) from an image that is captured by a camera or the like. The object detection technology includes learning the features of objects to be detected to create learning data in advance, and comparing the created learning data and image data to determine whether the objects to be detected are included in the image.

With such object detection technology, it is important to reduce the processing load for object detection. There have thus been devised various types of techniques for reducing the processing load. For example, there are known techniques for reducing the processing load by classifying consecutive frames into full search frames where the whole areas of the frames are searched for objects and non-search frames where no search is intended. When an object is found, the vicinity of the object-found position is searched in the subsequent frames (for example, see Japanese Laid-open Patent Publication No. 2004-171490). In an existing quantization technique for image information, image data is subjected to frequency conversion (wavelet transform) and quantization processing is performed based on the magnitudes of the resulting conversion coefficients (or the magnitudes of differences in pixel value between adjoining pixels) (for example, see H. Schneiderman and T. Kanade, "Object Detection Using the Statistics of Parts", *International Journal of Computer Vision*, 2002, which is referred to as "*Schneiderman*" hereinafter).

The foregoing conventional techniques, however, have had the problem that it is not possible to reduce the time necessary for object detection.

For example, when full search frames and non-search frames are set for object detection, the total amount of calculation is reduced in terms of a plurality of frames. With the intermittent, regular appearance of frames to be fully searched for objects, however, the object detection in such full search frames is not shortened at all.

SUMMARY

According to an aspect of an embodiment of the invention, an image processing apparatus includes a storing unit that stores learning data including a feature of a face image; an input unit that accepts input of a moving image; a face detection processing unit that reduces an image of a frame to be processed to a first level among several reduction levels to generate a reduced image of the frame to be processed, with one of frames included in the moving image accepted by the input unit as the frame to be processed, and compares the reduced image generated by the reducing unit and the learning data to extract a face image from the reduced image; and an output unit that outputs a result of extraction of the face image. When the extraction of the face image from the frame to be processed is ended, the face detection processing unit updates the frame to be processed to a next frame subsequent to the frame to be processed and generates a reduced image that is reduced to another level other than reduction levels adjoining the first level.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram (1) for explaining an outline and characteristics of an image processing apparatus according to a first embodiment;

FIG. 4 is a diagram (2) for explaining the outline and characteristics of the image processing apparatus according to the first embodiment;

FIG. 5 is a functional block diagram illustrating the configuration of the image processing apparatus according to the first embodiment;

FIG. 7 is a chart illustrating an example of the data structure of non-face learning data;

FIG. 8 is a chart illustrating an example of the data structure of comparison target data;

FIG. 10 is a chart illustrating an example of the data structure of a comparison result table;

FIG. 11 is a diagram for explaining how detection ranges move;

FIG. 19 is a diagram illustrating the hardware configuration of a computer that constitutes the image processing apparatus according to the present embodiment.

DESCRIPTION OF EMBODIMENTS

Preferred embodiments of the present invention will be explained with reference to accompanying drawings. It should be noted that the present invention is not limited by such embodiments.

[a] First Embodiment

Figure 1:
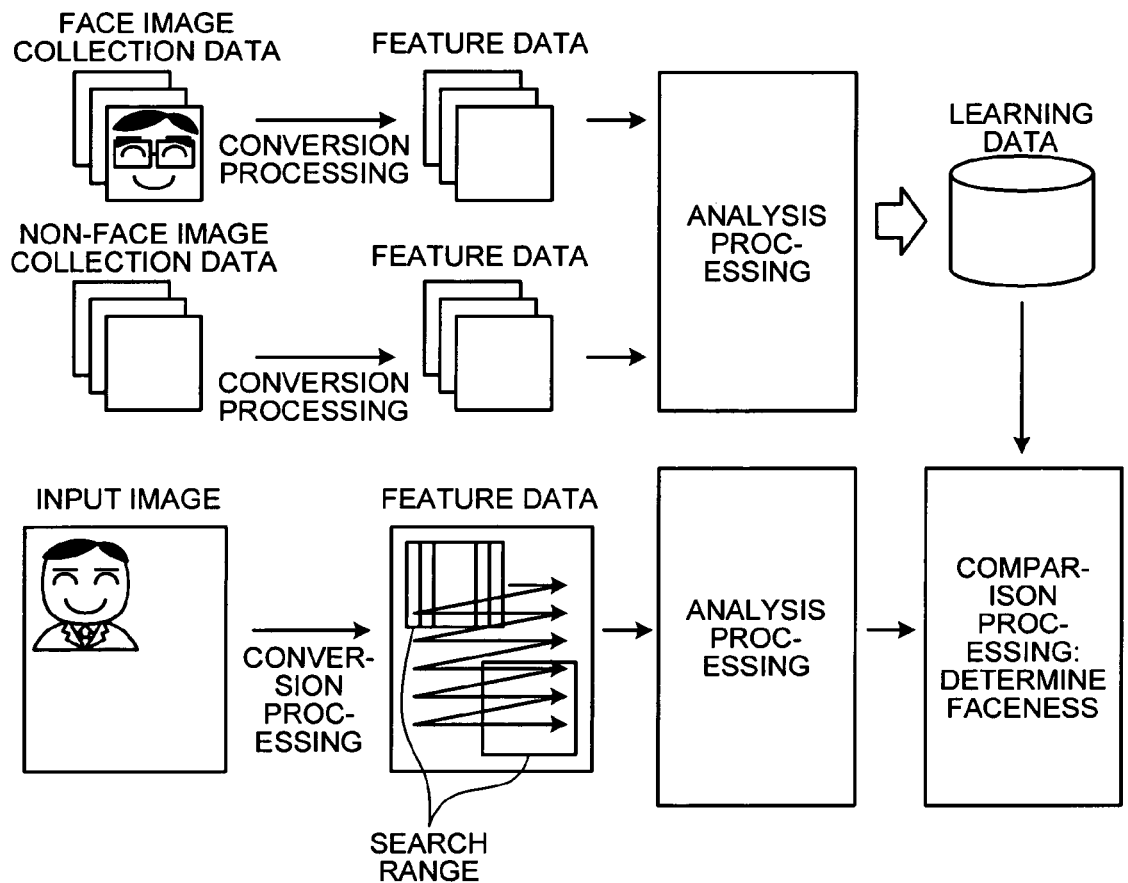
FIG. 1 is a diagram (1) for explaining a conventional object detection method.
Figure 2:
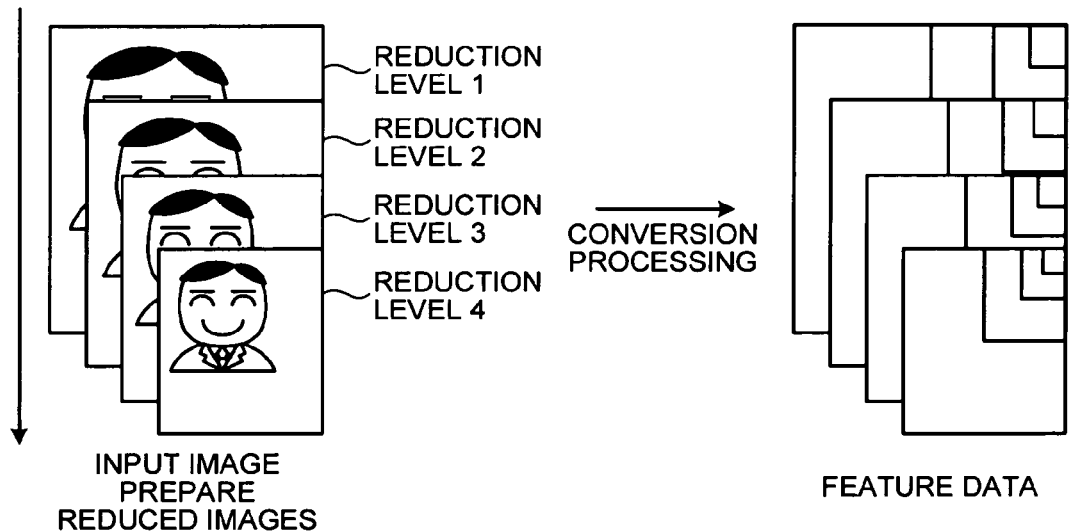
FIG. 2 is a diagram (2) for explaining the conventional object detection method.

Before describing the image processing apparatus according to a first embodiment, a description will be given of an object detection method to be performed by a conventional image processing apparatus. FIGS. 1 and 2 are diagrams for explaining the conventional object detection method. In the conventional object detection method, learning data is initially created for preparation.

To create the learning data, the image processing apparatus performs frequency conversion (for example, wavelet transform) on face image collection data and non-face image collection data, thereby creating feature data that contains the features of face images and feature data that contains the features of non-face images. Here, the face image collection data is image data on a collection of face images of various persons. The image data included in the face image collection data is composed of a collection of images each corresponding to a face in full size, covering most of the vertical length from the head to the chin and most of the horizontal width from ear to ear. It will be understood that since the learning data is intended for the detection of various faces, it may include not only data on facial shots from right in front, but also data on shots obliquely upward, downward, to the right, and to the left, data on faces with a hat or with glasses, and data on persons of all ages and genders. The non-face image collection data is image data on a collection of various images other than face images. The image processing apparatus analyzes the pieces of feature data and quantizes the pieces of feature data to create the learning data.

To determine whether a moving image includes a face image, the image processing apparatus performs frequency conversion on the input image data (image data on each frame included in the moving image) to create feature data that contains the features of the input image. Subsequently, the image processing apparatus sets a search range on the feature data (the range for the features of the face image collection data to be searched for, being clipped out by shifting the clipping position so as to scan inside the input frame). The image processing apparatus then analyses the search range, quantizes the data in the search range, and compares the quantized data with the learning data created in advance to determine whether a face image is included in the search range. After the end of the comparison in the search range, the image processing apparatus moves the search range inside the input image in succession to repeat the foregoing processing. The image processing apparatus thereby detects all face images included in the input image.

Input images can include various sizes of face images. To cope with face images of various sizes, the conventional image processing apparatus reduces the input image into various sizes and performs object detection processing on the reduced input images (see FIG. 2). A face image included in an input image may fail to be detected despite its presence if the face image is greater than the detection range. Such a face image can be appropriately detected when the input image is reduced so that the face image falls within the detection range.

For example, with reduction levels 1 to 4 as illustrated in FIG. 2, the image processing apparatus reduces each frame of the input image in order of the reduction levels 1, 2, 3, and 4, and performs the object detection processing in succession. Here, the image size at the reduction level 4<the image size at the reduction level 3<the image size at the reduction level 2<the image size at the reduction level 1.

The face image collection data intended for the creation of the learning data includes various sizes of face images. Some face images have larger facial areas and some have smaller facial areas with respect to the size of the image area. When images are reduced to a certain reduction level for object detection, face images somewhat greater and ones somewhat smaller than the intended size are often detected aside from ones of the intended size.

For example, when face images are reduced to the reduction level 2 for object detection, face images somewhat greater (equivalent to face images reduced to the reduction level 1) and ones somewhat smaller (equivalent to face images reduced to the reduction level 3) than the intended size (the size of a face image reduced to the reduction level 2) are often found. The image processing apparatus of the present invention utilizes such face images to reduce the time for object detection.

Next, an outline and characteristics of the image processing apparatus according to the first embodiment will be described. FIGS. 3 and 4 are diagrams for explaining the outline and characteristics of the image processing apparatus according to the first embodiment. The first embodiment will deal with an example where the reduction levels range from 0 to 7. The reduction level 0 is the smallest, and the image size increases with the increasing reduction level from 0 to 7.

The image processing apparatus according to the first embodiment performs object detection by changing the reduction level systematically so that the reduction levels before and after a change do not adjoin each other. For example, the image processing apparatus changes the reduction level not like 0, 1, 2, 3, 4, 5, 6, and 7 in order, but like 0, 4, 2, 6, 1, 5, 3, and 7 for object detection. The reduction level is changed when the frame of the moving image to be searched is switched. In FIG. 3, the black circles indicate that a face of right size "may be" found. The circles with diagonally right up lines indicate that a face of near size "may be" found. The circles with a checker pattern indicate that a face of right size "was found". The circles with a dot pattern indicate that a face of near size "was found".

For example, a description will be given of a case where a moving image includes faces 1 to 3 as illustrated in FIG. 4, and object detection is performed on such a moving image with the reduction levels changed in order of 0, 4, 2, 6, 1, 5, 3, and 7. Suppose that the face 1 is a face image equivalent to the reduction level 2, the face 2 is a face image equivalent to the reduction level 1, and the face 3 is a face image equivalent to the reduction level 4.

At the first frame of the moving image, the image processing apparatus initially reduces the image to the reduction level 0 and performs object detection, whereby the face 2 equivalent to the reduction level 1 is detected. Next, at the second frame, the image processing apparatus reduces the image to the reduction level 4 and performs object detection, whereby the face 3 equivalent to the reduction level 4 is detected. Next, at the third frame, the image processing apparatus reduces the image to the reduction level 2 and performs object detection, whereby the face 1 equivalent to the reduction level 1 and the face 2 equivalent to the reduction level 2 are detected. The image processing apparatus ends the detection of the faces 1 to 3 included in the moving image. That is, the detection of the faces 1 to 3 is ended after the processing of three levels 0, 4, and 2. If, in the example of FIG. 4, the face detection is performed by changing the reduction level in descending order or ascending order, the detection of the faces 1 to 3 is ended after the processing of four levels, starting from level 0 to levels 1, 2, and 3. According to the image processing apparatus of the present embodiment, it is therefore possible to detect faces of various levels of size more quickly than when the reduction level is changed in order.

Since the image processing apparatus according to the first embodiment performs the object detection processing by changing the reduction level so that the reduction levels before and after a change are not consecutive, it is possible to reduce the time for object detection. What size of face the input frame includes is unknown. A plurality of reduction levels can be covered more quickly and evenly when the reduction level is changed so that the reduction levels before and after a change are not consecutive.

In the conventional object detection, the image in each frame of the moving image is reduced to all the reduction levels and subjected to object detection. The image processing apparatus according to the first embodiment reduces the image in each frame of the moving image to a single reduction level and performs object detection. This can reduce the load on the image processing apparatus.

Next, the configuration of the image processing apparatus according to the first embodiment will be described. FIG. 5 is a functional block diagram illustrating the configuration of the image processing apparatus according to the first embodiment. As illustrated in FIG. 5, an image processing apparatus 100 includes a conversion processing unit 110, an analysis processing unit 120, a storing unit 130, and a face detection processing unit 140.

The conversion processing unit 110 is a processing unit that acquires face image collection data and non-face image collection data and performs frequency conversion processing (for example, wavelet transform) on the face image collection data and non-face image collection data acquired. The frequency conversion processing on the image data is the same as that of known techniques.

The conversion processing unit 110 acquires the face image collection data and the non-face image collection data from an input device, a storage device (not illustrated), and the like. The conversion processing unit 110 outputs the frequency-converted face image collection data and non-face image collection data to the analysis processing unit 120. In the following description, the frequency-converted face image collection data will be referred to as converted face image collection data. The frequency-converted non-face image collection data will be referred to as converted non-face image collection data.

The analysis processing unit 120 is a processing unit that acquires the converted face image collection data and the converted non-face image collection data and then creates face learning data on the basis of the converted face image collection data and creates non-face learning data on the basis of the converted non-face image collection data.

Initially, the processing by which the analysis processing unit 120 creates the face learning data will be described. The analysis processing unit 120 extracts a single piece of image data from the image data included in the converted face image collection data. The analysis processing unit 120 then compares the conversion coefficients and quantization thresholds to quantize the relevant conversion coefficient values. The quantization thresholds shall be set in the analysis processing unit 120 in advance.

The analysis processing unit 120 similarly quantizes the rest of the image data included in the converted face image collection data by the foregoing method. The analysis processing unit 120 then compares the conversion coefficient values of the respective pieces of quantized image data (the conversion coefficient values corresponding to the same positions in the respective pieces of image data), and creates face learning data on the basis of the frequencies of the conversion coefficient values. For example, the analysis processing unit 120 compares the conversion coefficient values at position (x1, y1) in the respective pieces of image data. If a conversion coefficient value "1" indicates a frequency higher than those of the other conversion coefficient values, the analysis processing unit 120 sets the conversion coefficient value at position (x1, y1) of the face learning data to "1".

Figure 6:
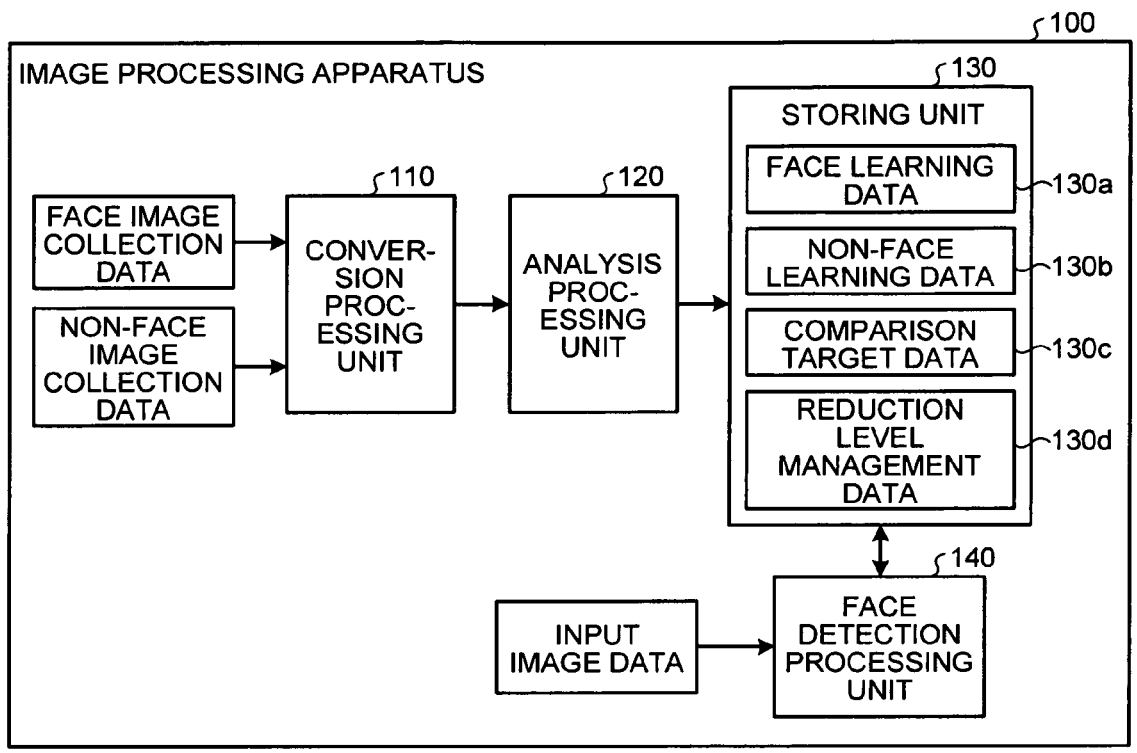
FIG. 6 is a chart illustrating an example of the data structure of face learning data.

FIG. 6 is a chart illustrating an example of the data structure of the face learning data. As illustrated in FIG. 6, the face learning data contains position information and conversion coefficient values in association with each other. It should be noted that the data structure of the face learning data is not limited to the one illustrated in FIG. 6. For example, conversion coefficient values may be stored in association with respective blocks of conversion coefficients (for example, eight coefficients) to be compared for object detection.

Next, the processing by which the analysis processing unit 120 creates the non-face learning data will be described. The analysis processing unit 120 extracts a single piece of image data from the image data included in the converted non-face image collection data. The analysis processing unit 120 then compares the conversion coefficients and quantization thresholds to quantize the relevant conversion coefficient values.

The analysis processing unit 120 similarly quantizes the rest of the image data included in the converted non-face image collection data by the foregoing method. The analysis processing unit 120 then compares the conversion coefficient values of the respective pieces of quantized image data (the conversion coefficient values corresponding to the same positions in the respective pieces of image data), and creates non-face learning data on the basis of the frequencies of the conversion coefficient values. For example, the analysis processing unit 120 compares the conversion coefficient values at position (x1, y1) in the respective pieces of image data. If a conversion coefficient value "1" indicates a frequency higher than those of the other conversion coefficient values, the analysis processing unit 120 sets the conversion coefficient value at position (x1, y1) of the non-face learning data to "1".

FIG. 7 is a chart illustrating an example of the data structure of the non-face learning data. As illustrated in FIG. 7, the non-face learning data contains position information and conversion coefficient values in association with each other. It should be noted that the data structure of the non-face learning data is not limited to the one illustrated in FIG. 7. For example, pixel values may be stored in association with respective blocks of conversion coefficients (for example, eight coefficients) to be compared for object detection.

The storing unit 130 is a storing unit that stores face learning data 130a and non-face learning data 130b which are output from the analysis processing unit 120, and comparison target data 130c and reduction level management data 130d which are output from the face detection processing unit 140. Of these, the comparison target data 130c and the reduction level management data 130d will be described later.

The face detection processing unit 140 is a processing unit that acquires moving image data and then detects a face image from the image data included in each frame of the moving image data. The face detection processing unit 140 outputs the result of detection to a host apparatus (not illustrated). Hereinafter, the processing of the face detection processing unit 140 will be described concretely.

The face detection processing unit 140 initially refers to the reduction level management data 130*d* to determine the reduction level. The reduction level management data 130*d* is data for storing a reduction level. For example, when the reduction level 0 is stored in the reduction level management data 130*d*, the face detection processing unit 140 reduces image data to any of the reduction levels other than the reduction level 0. The reduction level management data 130*d* is successively updated by the face detection processing unit 140.

Determining the reduction level, the face detection processing unit 140 reduces the image data (image data included in the frame of the moving image data) on the basis of the result of determination. For example, if the reduction level is the reduction level 1, the face detection processing unit 140 reduces the image data to the reduction level 1. The face detection processing unit 140 then changes the reduction level stored in the reduction level management data 130*d* so that the reduction levels before and after a change do not adjoin each other. For example, if the reduction level is 2, the adjoining reduction levels are levels 1 and 3. The face detection processing unit 140 then changes the reduction level to other than levels 1 and 3 so that the reduction level after a change is not an adjoining one.

Next, the face detection processing unit 140 performs frequency conversion processing (for example, wavelet transform) on the reduced image data. After the frequency conversion, the face detection processing unit 140 quantizes the frequency-converted image data to create the comparison target data 130*c*.

Now, the processing to create the comparison target data 130*c* will be described concretely. The face detection processing unit 140 compares the conversion coefficients resulting from the frequency conversion processing on the image data with quantization thresholds, thereby quantizing the pixel values of the relevant block to create the comparison target data 130*c*.

FIG. 8 is a chart illustrating an example of the data structure of the comparison target data 130*c*. As illustrated in FIG. 8, the comparison target data 130*c* contains position information and conversion coefficient values in association with each other. It should be noted that the data structure of the comparison target data 130*c* is not limited to the one illustrated in FIG. 8. For example, conversion coefficient values may be stored in association with respective blocks of conversion coefficients (for example, eight coefficients) to be compared for object detection.

The face detection processing unit 140 then compares the face learning data 130*a*, the non-face learning data 130*b*, and the comparison target data 130*c* stored in the storing unit 130 to determine whether the image data includes a face image.

Figure 9:
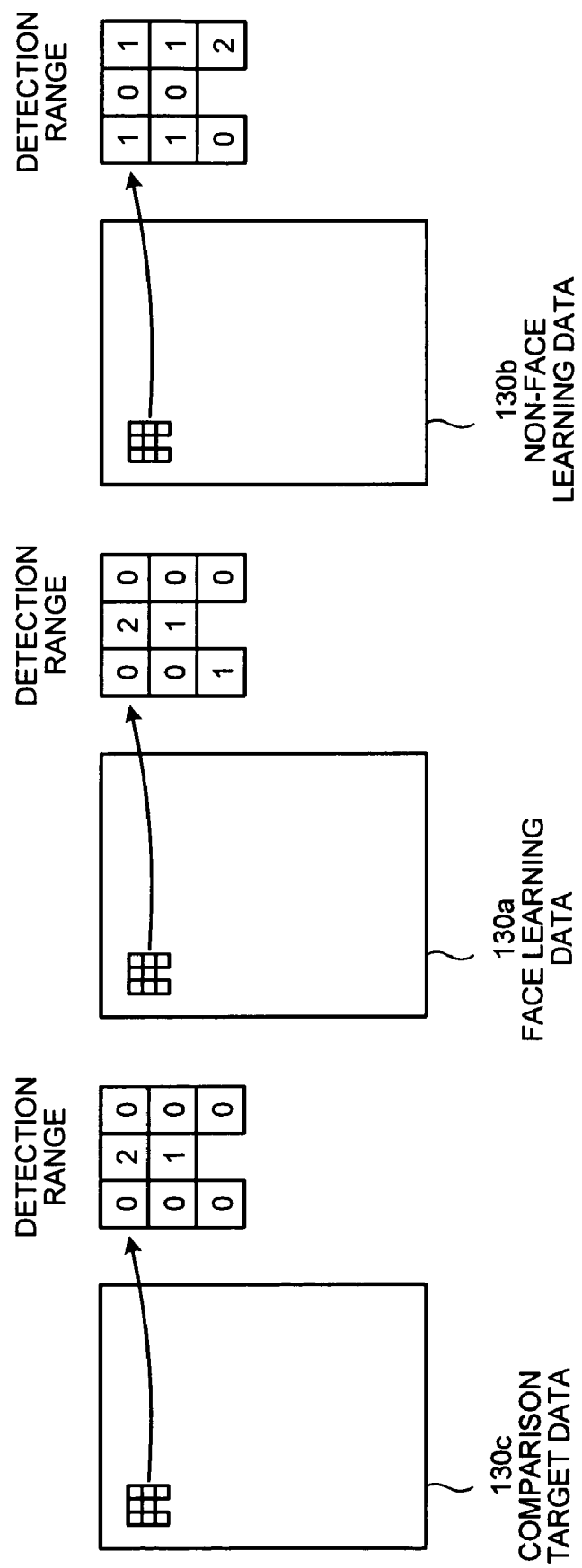
FIG. 9 is a diagram for explaining an example of the processing of a face detection processing unit.

FIG. 9 is a diagram for explaining an example of the processing of the face detection processing unit 140. Specifically, the face detection processing unit 140 sets a detection range, and compares conversion coefficient values included in the detection ranges at the same positions of the face learning data 130*a*, the non-face learning data 130*b*, and the comparison target data 130*c*. The face detection processing unit 140 then determines from the comparison result whether the detection range of the comparison target data is similar to that of the face learning data or that of the non-face learning data, and registers the result of determination in a comparison result table. Such a comparison result table shall be retained by the face detection processing unit 140.

In the example illustrated in FIG. 9, the comparison target data 130*c* has seven hits with the face learning data 130*a*, and one hit with the non-face learning data 130*b*. The comparison target data 130*c* is thus determined to be more similar to the face learning data 130*a* than to the non-face learning data 130*b*.

FIG. 10 is a chart illustrating an example of the data structure of the comparison result table. As illustrated in FIG. 10, the comparison result table contains detection range identification information, which identifies the detection range, and comparison results in association with each other. If the comparison between the detection ranges of the face learning data 130*a*, the non-face learning data 130*b*, and the comparison target data 130*c* results in the determination that the comparison target data 130*c* is similar to the face learning data 130*a*, the face detection processing unit 140 registers a "circle" in the comparison result. If the comparison target data 130*c* is determined to be similar to the non-face learning data 130*b*, the face detection processing unit 140 registers a "cross" in the comparison result.

A specific description will be given with reference to FIG. 9. For example, suppose that the detection range identification information on the detection ranges currently set for the respective pieces of image data 130*a* to 130*c* is "1001". The face detection processing unit 140 compares the pixel values in the detection range of the comparison target data 130*c* with those in the detection range of the face learning data 130*a*, and finds seven hits.

The face detection processing unit 140 compares the pixel values in the detection range of the comparison target data 130*c* with those in the detection range of the non-face learning data 130*b*, and finds one hit. Since the number of hits is greater with the face learning data 130*a* than with the non-face learning data 130*b*, the face detection processing unit 140 sets a "circle" to the comparison result corresponding to the detection range identification information "1001". On the other hand, if the number of hits with the non-face learning data 130*b* is greater, the face detection processing unit 140 sets a "cross". If the numbers of hits are the same, neither will be set.

The face detection processing unit 140 moves the detection ranges as illustrated in FIG. 11 and registers a "circle" or "cross" into the comparison result of the comparison result table in succession. FIG. 11 is a diagram for explaining how the detection ranges move. When the face detection processing unit 140 compares the pixel values in the detection ranges, the detection ranges will be located in the same positions on the face learning data 130*a*, the non-face learning data 130*b*, and the comparison target data 130*c*.

After the end of the comparison between the comparison target data 130*c*, the face learning data 130*a*, and the non-face learning data 130*b*, the face detection processing unit 140 consults the comparison result table. If the number of "circles" is greater than that of "crosses", the face detection processing unit 140 determines that the input image includes a face image. On the other hand, if the number of "circles" is smaller than that of "crosses", the face detection processing unit 140 determines that the input image includes no face image. If the number of "circles" and that of "crosses" are the same, the face detection processing unit 140 may determine either that a face image is included or not, depending on the administrator's setting.

While FIG. 9 illustrates the example where the face detection processing unit 140 compares the conversion coefficient values in units of eight conversion coefficients, this is not restrictive. For example, conversion coefficient values may be compared in units of n conversion coefficients (n is a natural number). The comparison results need not necessarily be saved with respect to each detection range as illustrated in FIG. 10. For example, the numbers of "circles" and "crosses"

may be summarized and only the result of summary may be stored in the comparison result table. The face detection technique described in Schneiderman may be used. Such a technique also uses face learning data and non-face learning data with wavelet transform coefficients for detection, and thus is highly consistent with the present invention and is capable of constituting the whole processing in combination with the following procedure.

Finishing the object detection processing on the reduced image data, the face detection processing unit 140 acquires the next frame from the moving image data. The face detection processing unit 140 then reduces the image data included in the next frame on the basis of the reduction level management data 130*d*, and repeats the foregoing processing.

Figure 12:
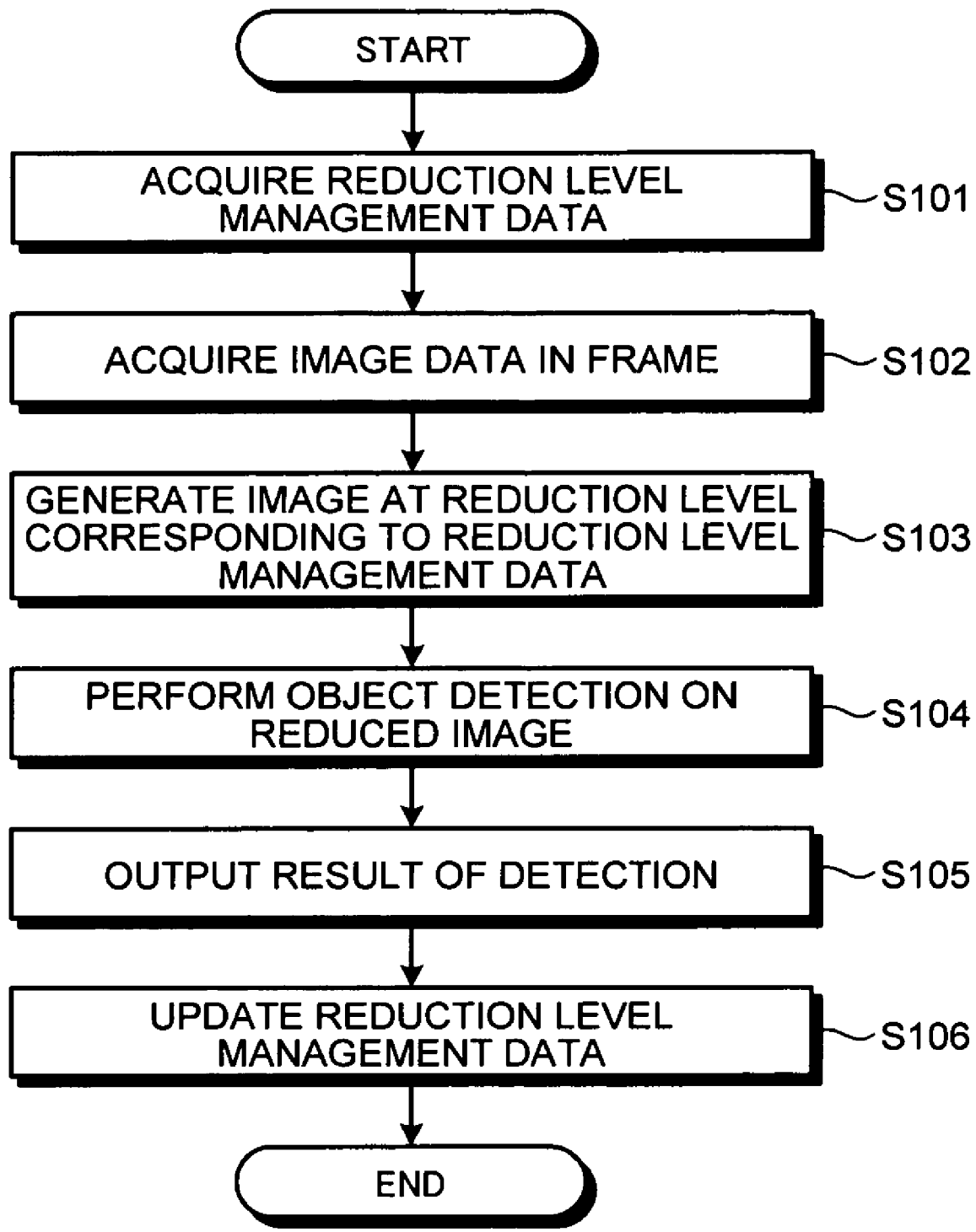
FIG. 12 is a flowchart illustrating the processing procedure of the image processing apparatus according to the first embodiment.

Next, the processing procedure of the image processing apparatus 100 according to the first embodiment will be described. FIG. 12 is a flowchart illustrating the processing procedure of the image processing apparatus 100 according to the first embodiment. As illustrated in FIG. 12, the image processing apparatus 100 acquires the reduction level management data 130*d* (step S101), and acquires the image data in a frame (step S102).

The image processing apparatus 100 then creates an image at the reduction level corresponding to the reduction level management data 130*d* (step S103), and performs the object detection processing on the reduced image (step S104).

The image processing apparatus 100 outputs the result of detection of the object detection processing (step S105), and updates the reduction level management data 130*d* (step S106). The image processing apparatus 100 repeats the processing illustrated in steps S101 to S106.

As has been described above, the image processing apparatus 100 according to the first embodiment performs object detection by changing the reduction level systematically so that the reduction levels before and after a change do not adjoin each other. This can reduce the time for object detection.

The first embodiment has dealt with the case where the object detection is performed while the reduction level is systematically changed so that the reduction levels before and after a change do not adjoin each other. However, the object detection may be performed by changing the reduction level in order (in order of 0, 1, 2, 3, 4, 5, 6, and 7, or in order of 7, 6, 5, 4, 3, 2, 1, and 0).

[b] Second Embodiment

Next, an image processing apparatus according to a second embodiment will be described. In general, an image processing apparatus reduces image data by combining a simple method of reduction down into a reduction size of one in a power of 2 and a complicated method of reduction into a finer reduction size.

For example, if both the simple reduction method and the complicated reduction method have four levels including levels 0 to 3, the simple reduction method and the complicated reduction method can be combined to provide 16-level reductions from level 0 to level 15. Level n refers to repeating reduction n times. For example, at level 2 of the simple reduction method, the simple reduction is repeated twice on the original image data.

In the following description, a combination of level 0 of the simple reduction method and level 0 of the complicated reduction method will be defined as the reduction level 0. A combination of level 0 of the simple reduction method and level 1 of the complicated reduction method will be defined as the reduction level 1. A combination of level 0 of the simple reduction method and level 2 of the complicated reduction method will be defined as the reduction level 2. A combination of level 0 of the simple reduction method and level 3 of the complicated reduction method will be defined as the reduction level 3.

A combination of level 1 of the simple reduction method and level 0 of the complicated reduction method will be defined as the reduction level 4. A combination of level 1 of the simple reduction method and level 1 of the complicated reduction method will be defined as the reduction level 5. A combination of level 1 of the simple reduction method and level 2 of the complicated reduction method will be defined as the reduction level 6. A combination of level 1 of the simple reduction method and level 3 of the complicated reduction method will be defined as the reduction level 7.

A combination of level 2 of the simple reduction method and level 0 of the complicated reduction method will be defined as the reduction level 8. A combination of level 2 of the simple reduction method and level 1 of the complicated reduction method will be defined as the reduction level 9. A combination of level 2 of the simple reduction method and level 2 of the complicated reduction method will be defined as the reduction level 10. A combination of level 2 of the simple reduction method and level 3 of the complicated reduction method will be defined as the reduction level 11.

A combination of level 3 of the simple reduction method and level 0 of the complicated reduction method will be defined as the reduction level 12. A combination of level 3 of the simple reduction method and level 1 of the complicated reduction method will be defined as the reduction level 13. A combination of level 3 of the simple reduction method and level 2 of the complicated reduction method will be defined as the reduction level 14. A combination of level 3 of the simple reduction method and level 3 of the complicated reduction method will be defined as the reduction level 15.

Figure 13:
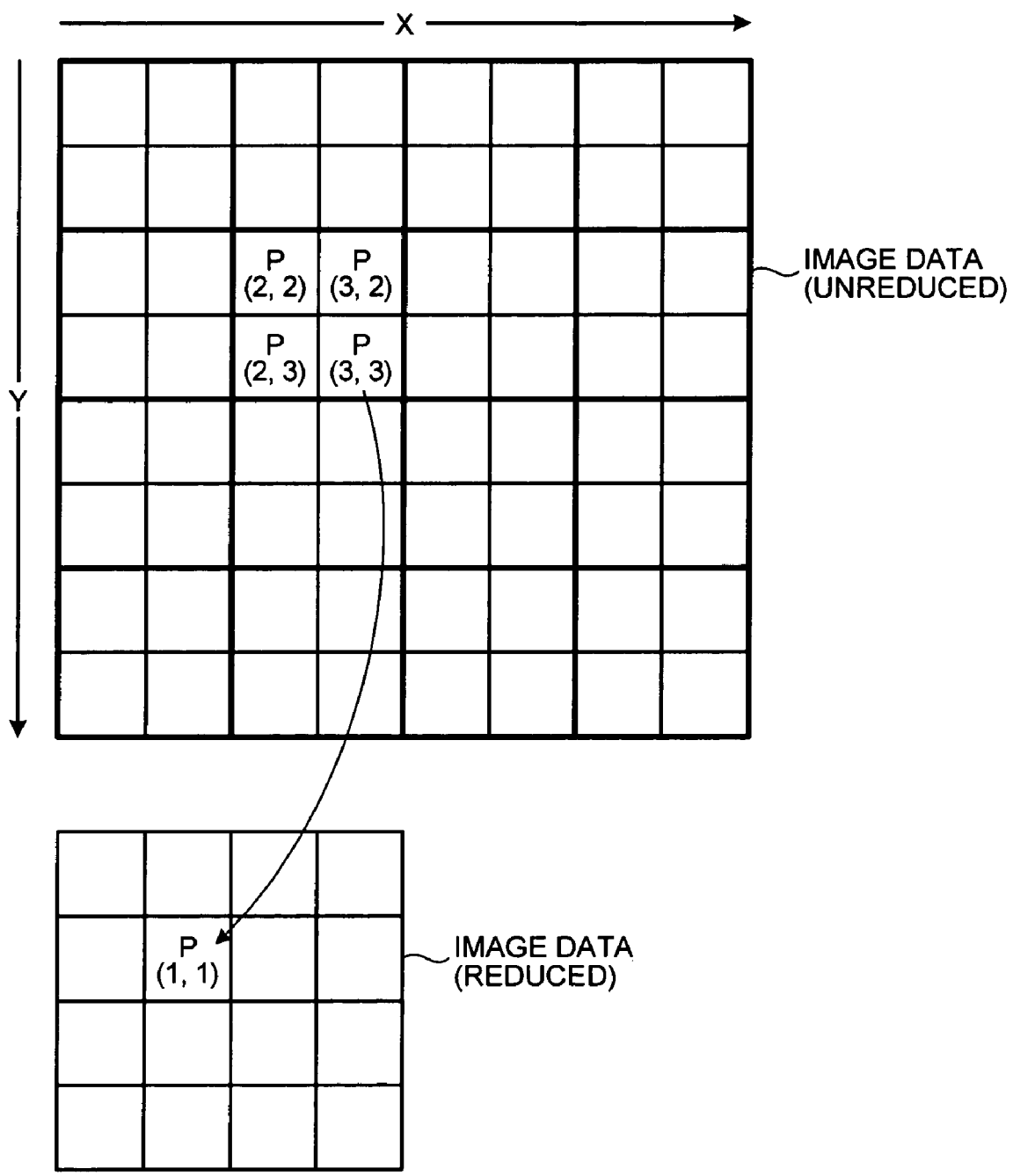
FIG. 13 is a diagram for explaining a simple reduction method.
Figure 14:
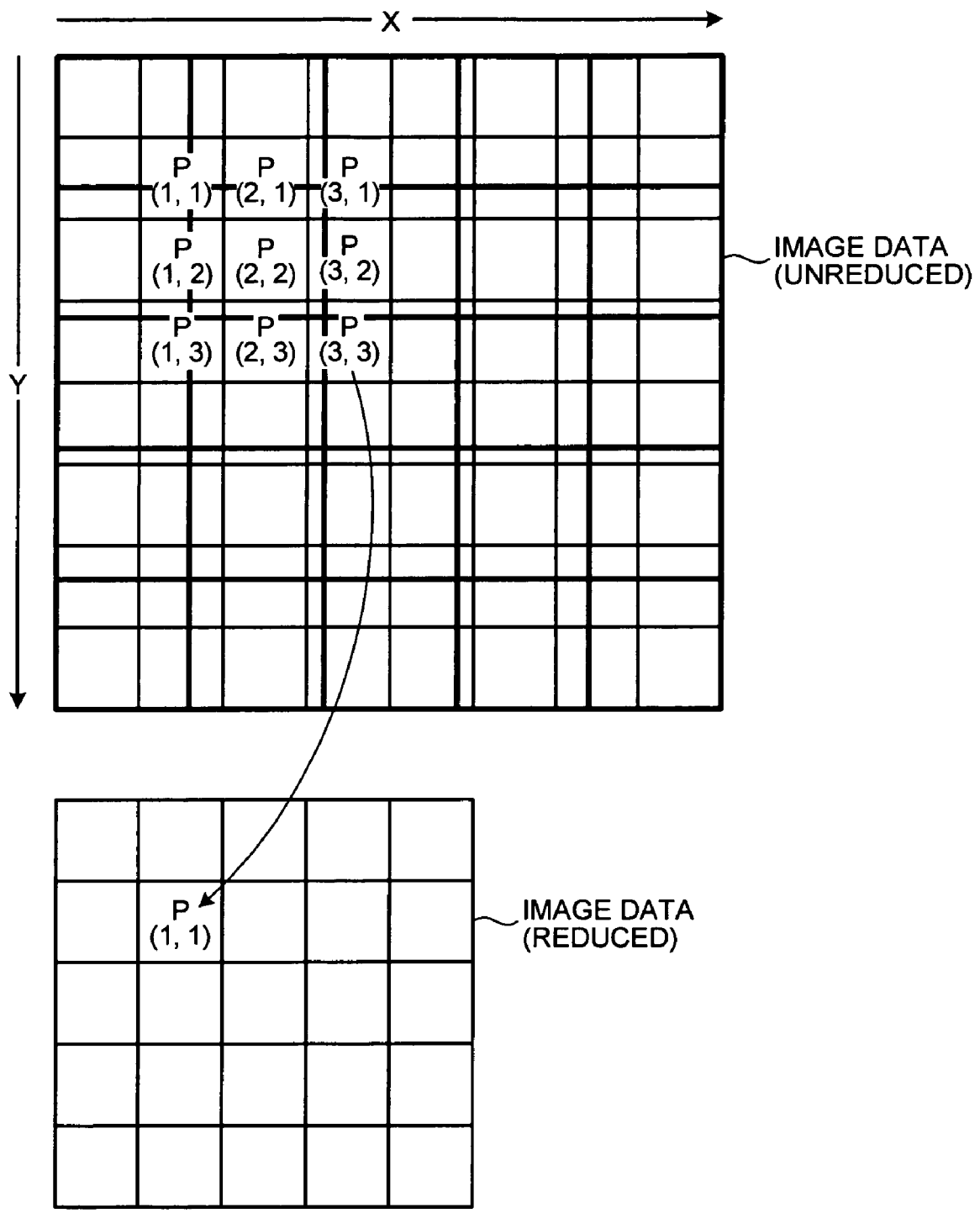
FIG. 14 is a diagram for explaining a complicated reduction method.

Now, the simple method of reduction into a reduction size of one in a power of 2 and the complicated method of reduction into a finer reduction size will be described. FIG. 13 is a diagram for explaining the simple reduction method. FIG. 14 is a diagram for explaining the complicated reduction method.

As illustrated in FIG. 13, the reduction of image data into one in a power of 2 is effected by dividing the image data into a plurality of blocks and averaging the pixel values of every four blocks. In the example illustrated in FIG. 13, the image data is reduced to ¼.

For example, the reduced pixel P[1,1] can be calculated by (P[2,2]+P[3,2]+P[2,3]+P[3,3])/4. The rest of the reduced coordinates can be calculated by the same way.

Now, as illustrated in FIG. 14, the reduction of image data into other than one in a power of 2 involves complicated calculations as compared to the method illustrated in FIG. 13. FIG. 14 illustrates a case where the image data is reduced to ⅝. In such a reduction method, a reduced pixel needs to be calculated not by simply averaging pixels but by calculating the pixels with their respective weights.

For example, the reduced pixel P[1,1] can be calculated by:

$$(P[1,1]\times 0.16+P[2,1]\times 0.4+P[3,1]\times 0.08+P[1,2]\times 0.4+P[2,2]\times 1+P[3,2]\times 0.2+P[1,3]\times 0.08+P[2,3]\times 0.2+P[3,3]\times 0.04)/2.56.$$

The rest of the reduced coordinates can be calculated by the same way.

For example, the reduction level 15 is the combination of level 3 of the simple reduction method and level 3 of the complicated reduction method. The original image data is thus subjected to the simple reduction (see FIG. 13) three times and the complicated reduction (see FIG. 14) three times.

As has been described in the first embodiment, since the face image collection data intended for the creation of the learning data includes face images of various sizes, some face images have larger facial areas and some have smaller facial areas with respect to the size of the image area. When images are reduced to a certain reduction level for object detection, face images somewhat greater and ones somewhat smaller than the intended size can often be detected aside from ones of the intended size.

For example, when images are reduced to the reduction level 2 for object detection, face images somewhat greater (equivalent to face images reduced to the reduction level 1) and ones somewhat smaller (equivalent to face images reduced to the reduction level 3) than the intended size (the size of a face image reduced to the reduction level 2) are often found.

For example, if it is possible to detect objects at the foregoing reduction levels 0, 4, 8, and 12, the complicated reduction processing need not be performed. Besides, selecting and using reduction levels belonging to an identical complicated reduction level makes it possible to process a plurality of reduction levels while minimizing the complicated reduction processing. This can suppress the load of the image reduction and allows efficient and early detection of faces of various sizes.

Figure 15:
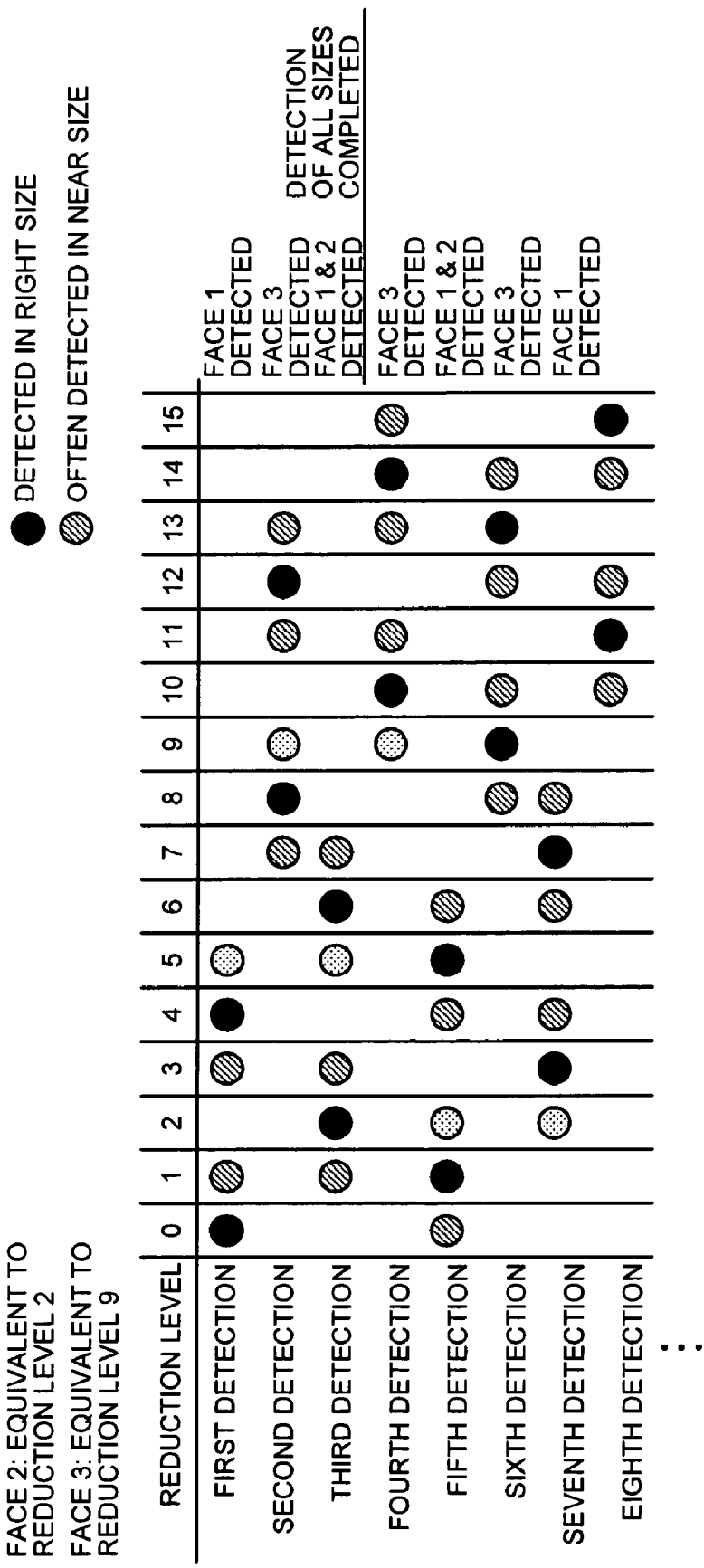
FIG. 15 is a diagram for explaining the outline and characteristics of an image processing apparatus according to a second embodiment.

In view of the foregoing, the image processing apparatus according to the second embodiment performs object detection by selecting the reduction levels 0, 4, 8, and 12 that involve no complicated reduction processing before the other reduction levels. FIG. 15 is a diagram for explaining the outline and characteristics of the image processing apparatus according to the second embodiment. In FIG. 15, the black circles indicate that a face of right size "may be" found. The circles with diagonally right up lines indicate that a face of near size "may be" found. The circles with a checker pattern indicate that a face of right size "was found". The circles with a dot pattern indicate that a face of near size "was found".

As an example, the image processing apparatus will perform object detection by reducing image data to the reduction levels 0 and 4 for the first round of the object detection processing. For the second round of the object detection processing, the image data is reduced to the reduction levels 8 and 12. For the third round of the object detection processing, the image data is reduced to the reduction levels 2 and 6. For the fourth round of the object detection processing, the image data is reduced to the reduction levels 10 and 14. For the fifth round of the object detection processing, the image data is reduced to the reduction levels 1 and 5. For the sixth round of the object detection processing, the image data is reduced to the reduction levels 9 and 13. For the seventh round of the object detection processing, the image data is reduced to the reduction levels 3 and 7. For the eighth round of the object detection processing, the image data is reduced to the reduction levels 11 and 15.

For example, a description will be given of a case where the moving image includes faces 1 to 3 as illustrated in FIG. 4, and object detection is performed on such a moving image with the reduction levels changed in the order illustrated in FIG. 15. The face 1 is a face image equivalent to the reduction level 5, the face 2 is a face image equivalent to the reduction level 2, and the face 3 is a face image equivalent to the reduction level 9.

In the first frame of the moving image, the image processing apparatus initially reduces the image to the reduction levels 0 and 4 and performs object detection, whereby the face 1 equivalent to the reduction level 5 is detected. Next, in the second frame, the image processing apparatus reduces the image to the reduction levels 8 and 12 and performs object detection, whereby the face 3 equivalent to the reduction level 9 is detected. Next, in the third frame, the image processing apparatus reduces the image to the reduction levels 2 and 6 and performs object detection, whereby the face 1 equivalent to the reduction level 5 and the face 2 equivalent to the reduction level 2 are detected. The image processing apparatus ends the detection of the faces 1 to 3 included in the moving image.

As described above, the image processing apparatus according to the second embodiment performs the object detection processing by preferentially selecting reduction levels that involve no complicated reduction processing, as well as selecting reduction levels belonging to an identical complicated reduction level. This can reduce the frequency of the complicated reduction processing and shorten the time for object detection.

Since the image processing apparatus according to the second embodiment performs the object detection processing by changing the reduction levels so that the reduction levels before and after a change are not consecutive, it is possible to reduce the time for object detection.

Figures 16, 17:
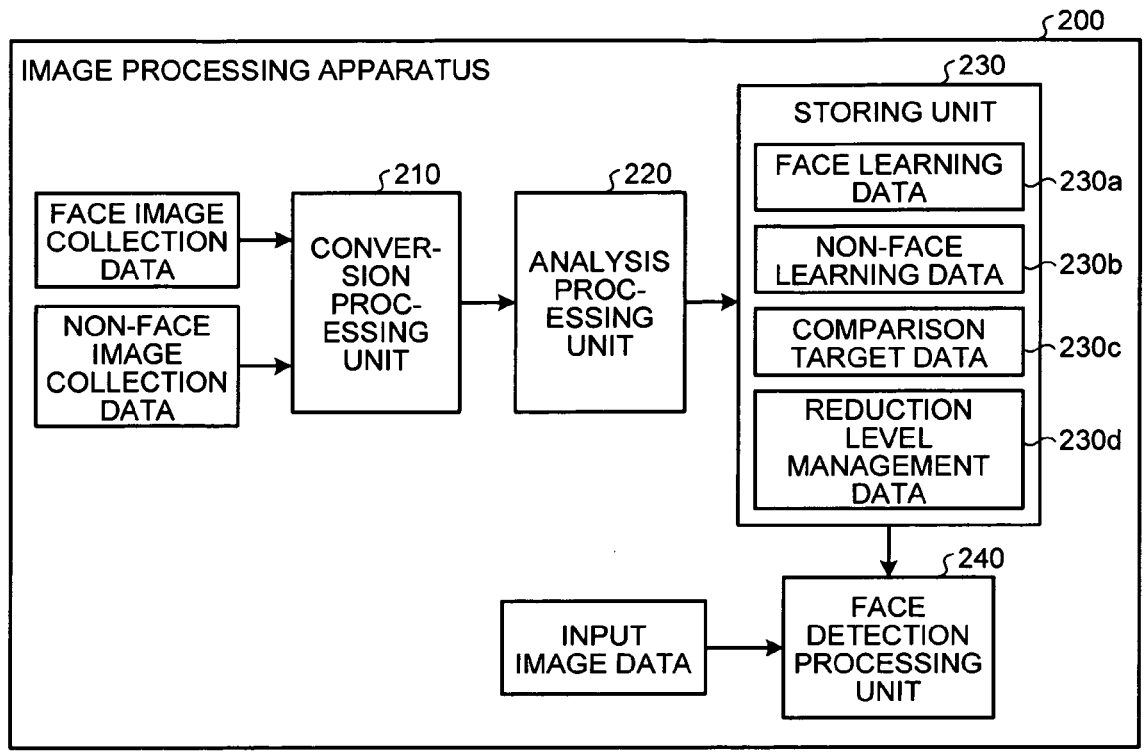
FIG. 16 is a functional block diagram illustrating the configuration of the image processing apparatus according to the second embodiment.
FIG. 17 is a chart illustrating an example of the data structure of reduction level management data.

Next, the configuration of the image processing apparatus according to the present embodiment will be described. FIG. 16 is a functional block diagram illustrating the configuration of an image processing apparatus 200 according to the second embodiment. As illustrated in FIG. 16, the image processing apparatus 200 includes a conversion processing unit 210, an analysis processing unit 220, a storing unit 230, and a face detection processing unit 240.

Of these, the conversion processing unit 210 and the analysis processing unit 220 are subject to the same description as that of the conversion processing unit 110 and the analysis processing unit 120 illustrated in FIG. 5. The storing unit 230 is a storing unit that stores face learning data 230a, non-face learning data 230b, comparison target data 230c, and reduction level management data 230d.

Of these, the face learning data 230a has the same data structure as that of the face learning data 130a illustrated in FIG. 6. The non-face learning data 230b has the same data structure as that of the non-face learning data 130b illustrated in FIG. 7. The comparison target data 230c has the same data structure as that of the comparison target data 130c illustrated in FIG. 8.

The reduction level management data 230d is data for managing the order of reduction levels to be used for reduction. FIG. 17 is a chart illustrating an example of the data structure of the reduction level management data 230d. As illustrated in FIG. 17, the reduction level management data 230d contains the order and reduction levels in association with each other.

The face detection processing unit 240 is a processing unit that acquires moving image data and detects a face image from the image data included in each frame of the moving image data. The face detection processing unit 240 outputs the result of detection to a host apparatus (not illustrated). Hereinafter, the processing of the face detection processing unit 240 will be described concretely.

The face detection processing unit 240 initially refers to the reduction level management data 230d to determine the reduction levels. For example, the face detection processing unit 240 manages the order by means of a counter or the like, and compares the counter value and the reduction level management data 230d to determine the reduction levels.

For example, when the counter value is "1", the reduction levels are 0 and 4. Determining the reduction levels, the face detection processing unit 140 increments the counter by one. The initial value of the counter is 1. While the foregoing description has dealt with an example where the face detection processing unit 240 determines the reduction levels by using a counter, the method of determination of the reduction levels is not limited thereto.

After the determination of the reduction levels, the face detection processing unit 240 reduces the image data (image data included in the frame of the moving image data) on the basis of the result of determination. For example, if the reduction levels are the reduction levels 0 and 4, the face detection processing unit 240 reduces the image data to the reduction levels 0 and 4.

Next, the face detection processing unit 240 performs frequency conversion processing (for example, wavelet transformation) on the reduced image data. After the frequency conversion, the face detection processing unit 240 quantizes the frequency-converted image data to create the comparison target data 230c (with two types of reductions, there are created two pieces of comparison target data 230c).

The face detection processing unit 240 then compares the face learning data 230a, the non-face learning data 230b, and the comparison target data 230c stored in the storing unit 230 to determine whether the image data includes a face image. The processing by which the face detection processing unit 240 performs face detection is the same as in FIG. 9. When there are two pieces of comparison target data 230c, the face detection processing unit 240 performs face detection on each piece of comparison target data 230c.

The face detection processing unit 240 then registers the result of detection in the comparison result table by the same way as the face detection processing unit 140 illustrated in FIG. 5 does. The comparison result table has the same data structure as that of the comparison result table illustrated in FIG. 10.

Finishing the object detection processing on the reduced image data, the face detection processing unit 240 acquires the next frame from the moving image data. The face detection processing unit 240 then reduces the image data included in the next frame on the basis of the reduction level management data 230d, and repeats the foregoing processing.

Figure 18:
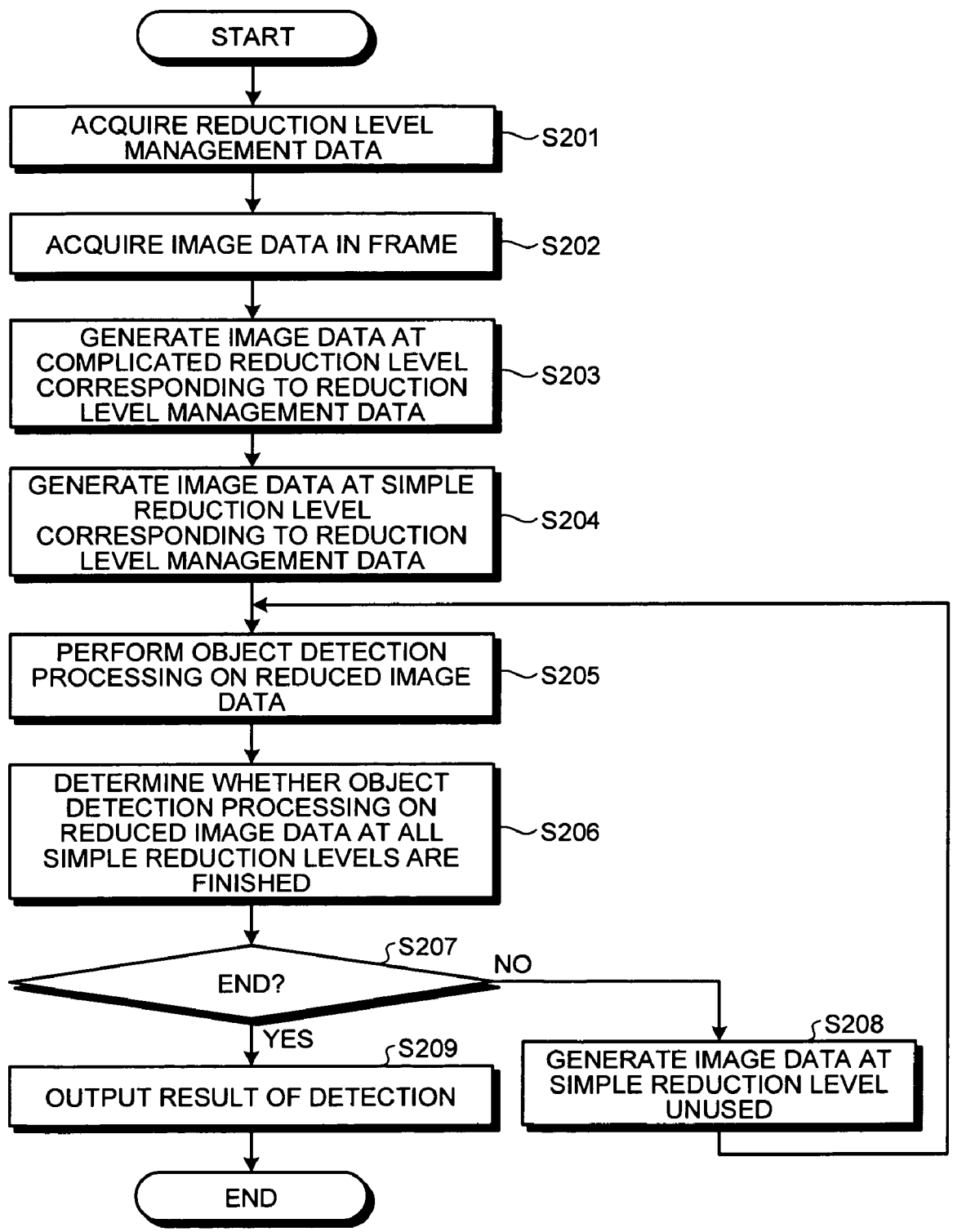
FIG. 18 is a flowchart illustrating the processing procedure of the image processing apparatus according to the second embodiment.

Next, the processing procedure of the image processing apparatus 200 according to the second embodiment will be described. FIG. 18 is a flowchart illustrating the processing procedure of the image processing apparatus 200 according to the second embodiment. As illustrated in FIG. 18, the image processing apparatus 200 acquires the reduction level management data 230d (step S201), and acquires the image data in a frame (step S202).

The image processing apparatus 200 generates image data at a complicated reduction level (a level of the complicated reduction method) corresponding to the reduction level management data 230d (step S203), and generates image data at a simple reduction level (a level of the simple reduction method) corresponding to the reduction level management data 230d (step S204).

The image processing apparatus 200 performs the object detection processing on the reduced image data (step S205), and determines whether the object detection processing on reduced image data at all the simple reduction levels are finished (step S206). If the object detection processing at all the simple reduction levels are not finished (step S207, No), the image processing apparatus 200 generates image data at a simple reduction level unused (step S208), and moves to step S205. On the other hand, if the object detection processing at all the simple reduction levels are finished (step S207, Yes), the image processing apparatus 200 outputs the result of detection (step S209). The image processing apparatus 200 repeats the processing illustrated in FIG. 18.

As has been described above, the image processing apparatus 200 according to the second embodiment acquires moving image data and performs object detection by selecting reduction levels that involve no complicated reduction processing before the other reduction levels when reducing the image data included in each frame. The image processing apparatus 200 also selects reduction levels that belong to an identical complicated reduction level. This can reduce the load of the reduction processing and speed up the object detection processing.

The foregoing description has deal with an example where the image processing apparatus 200 according to the second embodiment reduces the image data to two reduction levels per frame. This is not restrictive, however, and the object detection may be performed by reducing the image data to one reduction level per frame as in the foregoing first embodiment.

All or part of processes that have been described in the present embodiment as being automatically performed may be performed manually. All or part of processes that have been described as being manually performed may be automatically performed by publicly known methods. Moreover, the processing procedures, control procedures, specific names, and information including various data and parameters that have been described above or illustrated in the drawings may be arbitrarily modified unless otherwise specified.

The components of the image processing apparatuses 100 and 200 illustrated in FIGS. 5 and 16 are functionally conceptual ones, and need not necessarily have the illustrated physical configuration. Various types of processing procedures described in the present embodiments may be implemented by running a prepared program on a computer such as a personal computer or a workstation.

FIG. 19 is a diagram illustrating the hardware configuration of a computer that constitutes the image processing apparatus 100 (image processing apparatus 200) according to the present embodiments. As illustrated in FIG. 19, a computer (image processing apparatus) 30 includes an input device 31, a monitor 32, a random access memory (RAM) 33, a read only memory (ROM) 34, a communication control device 35 which performs communication with other devices over a network, a medium reading device 36 which reads data from a storing medium, a camera 37, a central processing unit (CPU) 38, and a hard disk drive (HDD) 39. Such components are connected with a bus 40.

The HDD 39 contains an image processing program 39b which provides the same functions as those of the image processing apparatus 100 described above. The CPU 38 reads and executes the image processing program 39b, whereby an image processing process 38a is activated.

Here, the image processing process 38a corresponds to the conversion processing unit 110, the analysis processing unit 120, and the face detection processing unit 140 of FIG. 5. The HDD 39 contains various data 39a corresponding to the information that is stored in the storing unit 130 of the image processing apparatus 100. The CPU 38 reads the various data 39a stored in the HDD 39, stores the data into the RAM 33, and performs the image data reduction processing and object detection by using various data 33a stored in the RAM 33.

It should be noted that the image processing program 39b illustrated in FIG. 19 need not necessarily be stored in the HDD 39 from the beginning. For example, the image processing program 39b may previously be stored in a "portable physical medium" such as a flexible disk (FD), CD-ROM, DVD disc, magneto-optical disc, and IC card to be inserted into the computer, a "stationary physical medium" such as a hard disk drive (HDD) which is provided inside or outside the computer, or "another computer (or server)" which is connected to the computer through a public circuit, the Internet, LAN, WAN, or the like. The computer may read the image processing program 39b from such a medium for execution.

According to the image processing apparatus, the object detection processing is performed by changing the reduction levels so that the reduction levels before and after a change are not consecutive. This can reduce the time for object detection.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus, comprising:
    a storing unit that stores learning data including a feature of a face image;
    an input unit that accepts input of a moving image;
    a face detection processing unit that reduces an image of a frame to be processed to a first level among several reduction levels to generate a reduced image of the frame to be processed, with one of frames included in the moving image accepted by the input unit as the frame to be processed, and compares the reduced image and the learning data to extract a face image from the reduced image; and
    an output unit that outputs a result of extraction of the face image, wherein
    when the extraction of the face image from the frame to be processed is ended, the face detection processing unit updates the frame to be processed to a next frame subsequent to the frame to be processed and generates a reduced image that is reduced to another level other than reduction levels adjoining the first level.

2. The image processing apparatus according to claim 1, wherein
    the face detection processing unit has functions of a first reduction and a second reduction to reduce the image, and
    the face detection processing unit compares a reduced image that is reduced by at least one of the first reduction and the second reduction and the learning data, to extract a face image from the reduce image.

3. An image processing method performed in an image processing apparatus, comprising:
    storing learning data including a feature of a face image into a storing device;
    accepting input of a moving image;
    reducing an image of a frame to be processed to a first level among several reduction levels to generate a reduced image of the frame to be processed, with one of frames included in the moving image as the frame to be processed;
    comparing the reduced image and the learning data to extract a face image from the reduced image;
    outputting a result of extraction of the face image; and
    updating the frame to be processed to a next frame subsequent to the frame to be processed, generating a reduced image that is reduced to another level other than reduction levels adjoining the first level, and extracting a face image from the reduced image again, when the extraction of the face image from the frame to be processed is ended.

4. The image processing method according to claim 3, wherein
    the reducing includes a first reducing and a second reducing to reduce the image; and
    the extracting includes comparing a reduced image that is reduced by at least one of the first reducing and the second reducing and the learning data, to extract a face image from the reduce image.

5. A computer-readable, non-transitory medium storing a program causing a computer to execute a process comprising:
    storing learning data including a feature of a face image into a storing device;
    accepting input of a moving image;
    reducing an image of a frame to be processed to a first level among several reduction levels to generate a reduced image of the frame to be processed, with one of frames included in the moving image as the frame to be processed;
    comparing the reduced image and the learning data to extract a face image from the reduced image;
    outputting a result of extraction of the face image; and
    updating the frame to be processed to a next frame subsequent to the frame to be processed, generating a reduced image that is reduced to another level other than reduction levels adjoining the first level, and extracting a face image from the reduced image again, when the extraction of the face image from the frame to be processed is ended.

6. The computer-readable, non-transitory medium according to claim 5, wherein
    the reducing includes a first reducing and a second reducing to reduce the image; and
    the extracting includes comparing a reduced image that is reduced by at least one of the first reducing and the second reducing and the learning data, to extract a face image from the reduce image.

* * * * *